Figure 1:
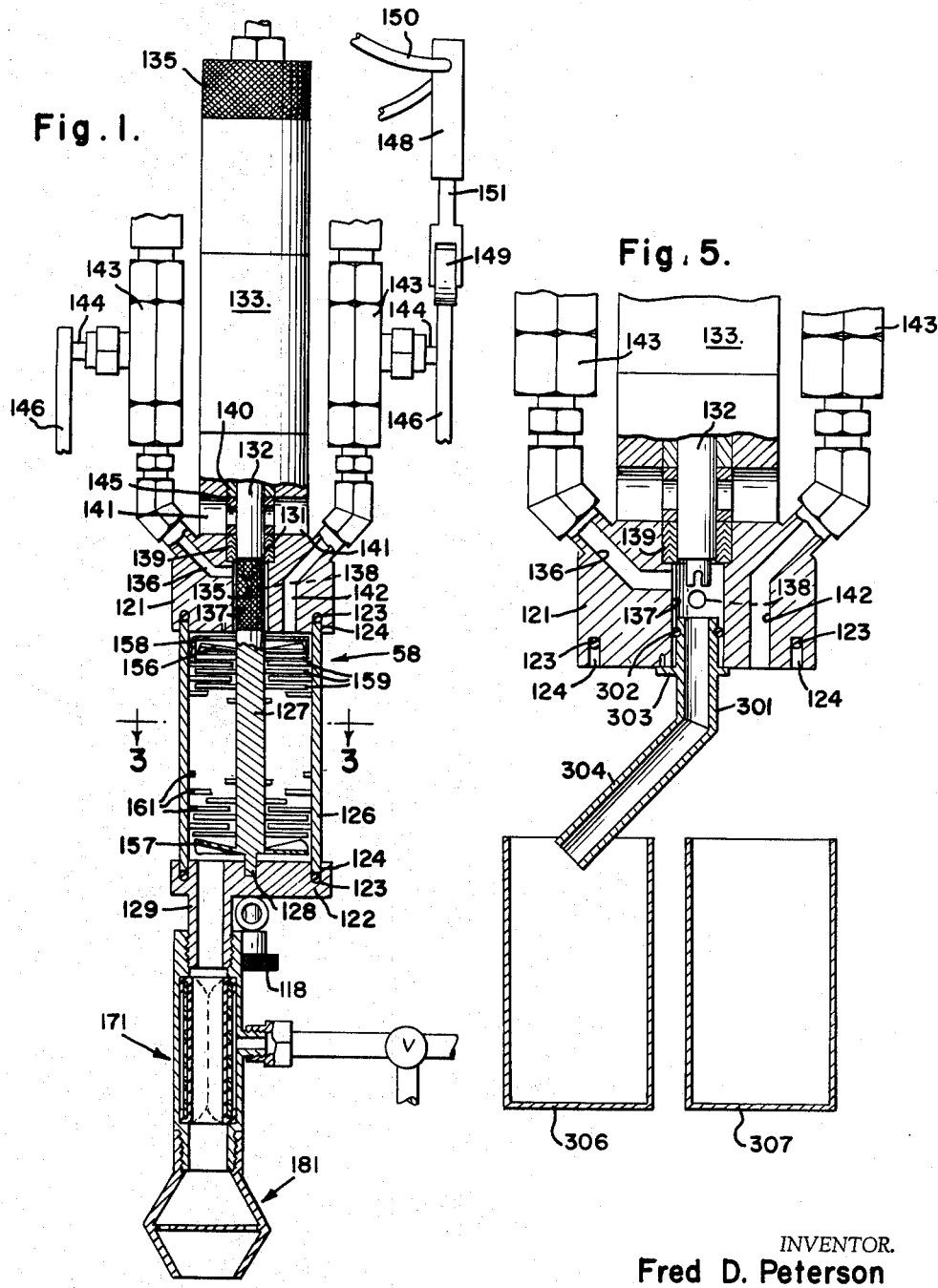

Dec. 7, 1965    F. D. PETERSON    3,222,134
DISPENSING HEAD FOR FOAM SYSTEM
Filed Aug. 3, 1962    2 Sheets-Sheet 1

INVENTOR.
Fred D. Peterson
BY

Dec. 7, 1965    F. D. PETERSON    3,222,134
DISPENSING HEAD FOR FOAM SYSTEM
Filed Aug. 3, 1962    2 Sheets-Sheet 2
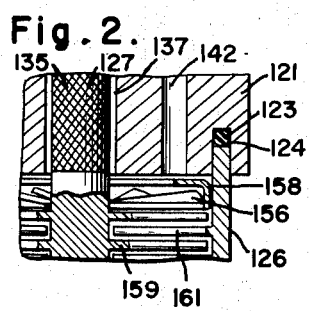
Fig. 2.
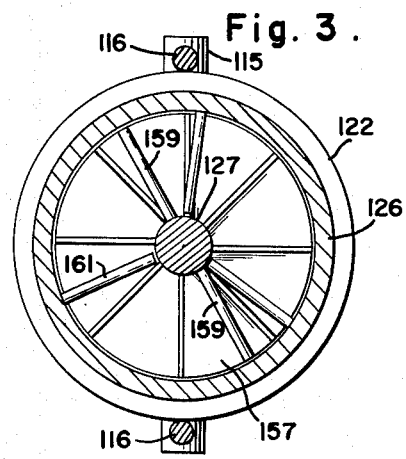
Fig. 3.
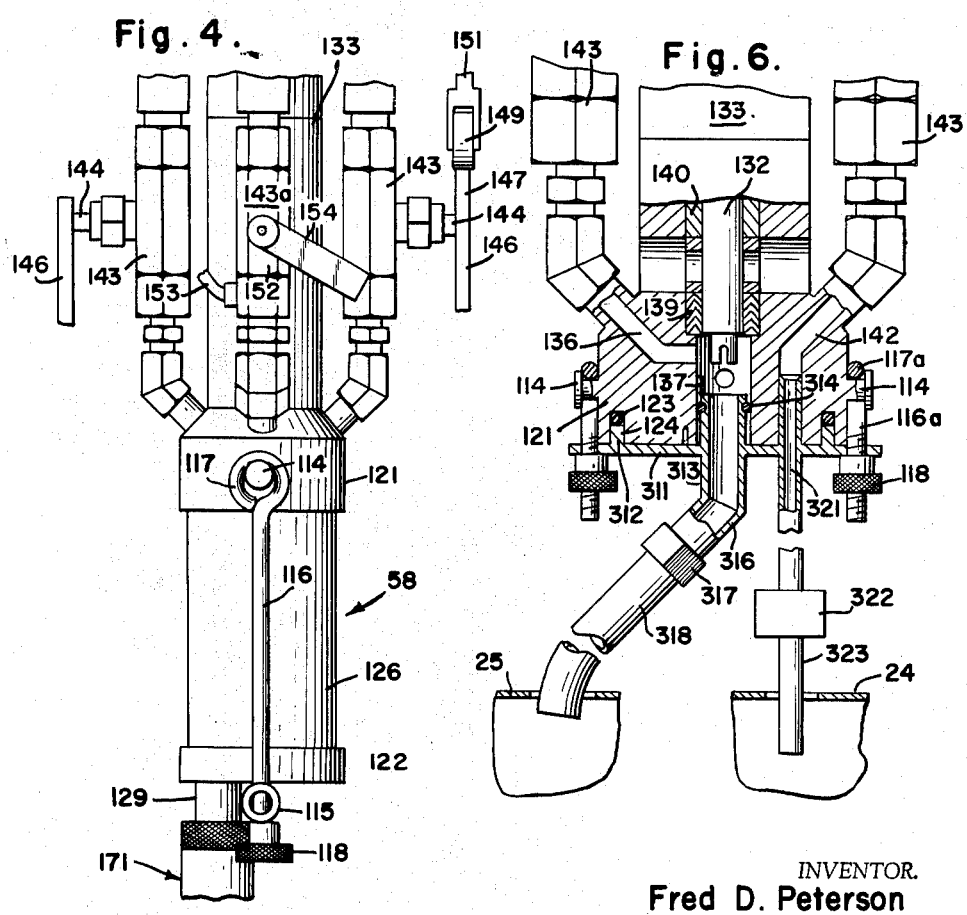
Fig. 4.
Fig. 6.
INVENTOR.
Fred D. Peterson
BY
Townsend and Townsend
attorneys United States Patent Office 3,222,134
Patented Dec. 7, 1965

3,222,134
DISPENSING HEAD FOR FOAM SYSTEM
Fred D. Peterson, San Mateo County, Calif., assignor to Peterson Products of San Mateo, Inc., Belmont, Calif.
Filed Aug. 3, 1962, Ser. No. 214,690
11 Claims. (Cl. 23—252)

This invention relates to a new and improved dispensing head for a foam system wherein at least three ingredients (one being a foaming agent) are mixed together and dispensed. A system in which said dispensing head may be incorporated is the subject of a patent application entitled, Foam Depositor System, Serial No. 180,620. A preferred form of the invention dispenses a rigid polyether urethane (polyurethane) foam. It will be understood that the invention has application to mixing and dispensing other products. However, the invention will be hereinafter described in detail adapted for polyurethane foam dispensing. Such foam requires thorough mixing at an elevated pressure of a fairly thin first component, a relatively dense second component, and a foaming agent such as liquefied Freon 12 (bichlorodifluoromethane). The components are maintained separate until reaching the head because they react chemically upon contact. Once discharged into the head they are thoroughly blended together under elevated perssure and dispensed at atmospheric pressure, thereby setting up a rigid foam.

The dispensing head used in accordance with this system has a number of features and advantages. Essentially the head consists of a mixing chamber in which the three ingredients are brought together and agitated and from which they are discharged at pressure at least as great as the vapor pressure of the foaming agent. The dispensing head is so constructed that back pressures are created throughout the chamber, thereby insuring proper mixing of the various ingredients.

A particular feature of the construction of the dispensing head is the means incorporated therein whereby the components are admitted to the mixing chamber and which insures proper mixing of the ingredients. Thus the foaming agent and the lighter of the two components are so directed into the mixing chamber that they first contact a rotating rod or shaft having a roughened or knurled surface, the surface friction of which blends the foaming agent and the first of the components together. The heavier component is preferably separately introduced to the mixture of lighter component and foaming agent. A further feature of the construction of the entrance end of the mixing chamber is the fact that an agitator is located at this zone, which agitator comprises a propeller constructed with a reverse thrust, the propeller preferably being shrouded along its outer tip so that the heavier ingredient will be directed back for recirculation through the propeller. Preferably the particular component having the thinnest viscosity and also preferably that not having TDI comes in contact with the propeller shaft along with the foaming agent (Freon). This results in a thorough mixing of the thinnest component and the foaming agent and the mixture of these two ingredients is then mixed with the thicker component. The three ingredients are thoroughly stirred by means of a series of turnstile-type stirring rods. A second propeller, which likewise has a reverse thrust, is located at the bottom of the agitator chamber, again insuring a back pressure which maintains the chamber filled at all times.

The mixing chamber is closed off at its lower end by means of a cap having its discharge orifice located displaced from the center of the cap. Hence the center of the cap may constitute the bottom bearing for the agitator shaft. A further feature of this construction is the fact that the fluid may constitute its own lubricant, lubricating the metal-to-metal contact.

Other features of the dispensing head relate to safety. Thus the dispensing head is held in assembled position by means of a yoke which has eye bolts, the eyes of which are not welded together. In the event of a build-up of pressure the eyes tend to open gradually and enable the caps at either end of the dispensing barrel to move apart relative to each other so that the components within the mixing chamber can escape without explosion.

A further feature of the construction is the fact that the caps are sealed to the barrel by means of O-rings seated in butt joints. Hence the ingredients tend to blow out sideward as contrasted with conventional means of sealing caps to opposite ends of a chamber barrel. Again, this construction reduces danger of explosion.

The foregoing construction likewise makes the assembly of the parts rapid and facilitates cleaning of the mechanism at the end of its use.

Other objects of the present invention will become apparent upon reading the following specification and referring to the accompanying drawings in which similar characters of reference represent corresponding parts in each of the several views.

In the drawings:
FIG. 1 is a longitudinal mid-sectional view through the dispensing head, back pressure regulator and associated mechanism.
FIG. 2 is a fragmentary enlarged sectional view of the upper end of the dispensing head.
FIG. 3 is a transverse sectional view taken substantially along the line of 3—3 of FIG. 1.
FIG. 4 is a side elevation of the structure of FIG. 1.
FIG. 5 is a fragmentary view partly broken away in section showing an attachment for the dispensing head, whereby the discharge of components from the dispensing head may be calibrated.
FIG. 6 is a view similar to FIG. 5 showing an attachment to the head whereby components may be re-circulated to the drums from which they have been pumped during periods when such re-circulation is desirable.

The mixing head 58, which is the subject of this invention is of an air turbine driven rotary mixer type. There is provided an upper block 121 and a lower block 122 each formed with an annular groove 123 receiving an O-ring 124. The opposite ends of cylinder barrel 126 fit into grooves 123 with O-rings 124 interposed between the edges of the barrel 126 and the bottoms of the grooves. A pair of diametrically opposed studs 114 project from the periphery of upper block 121. Extending across the bottom of lower block 122 is a rod 115. A pair of eye bolts 116 fit around studs, 114, the eyes, 117, thereof being open—i.e., not welded—so that excessive stress on bolts 116 causes the eyes 117 to expand. The lower ends of bolts 116 extend through holes in rod 115 and are retained in place by means of nuts 118. When it is desired to disassemble head 58, nuts 118 are removed, thereby separating blocks 121, 122, and enabling the cylinder barrel 126 to be removed. If, as has been mentioned, the pressure inside cylinder 126 becomes excessive, the eyes 117 open until the blocks 121, 122, move apart a sufficient distance so that the contents of the head may escape around the edges of barrel 126. The butt joints provided by grooves 123 enable the fluid inside head 58 to escape without interference from O-rings 124, a particular feature and advantage of the invention which prevents head 58 from exploding under excessive pressure.

Extending through head 58 is mixer shaft 127. The lower end 128 of shaft 127 is necked and is received in a bore in lower block 122, it being noted that the discharge nipple 129 of block 122 is off-center, thereby enabling block 122 to serve as a lower bearing for shaft 127. The upper end of shaft 127 extends through block 121 and is connected by means of coupling 131 to the shaft 132 of conventional air turbine 133 carried on the upper end of block 121. The arrangement heretofore described does not require external lubrication, in that the fluids dispensed through the mixing head provide their own lubrication for the metal-to-metal bearings. Turbine 133 is driven by compressed air and has a manual valve 135 controlling turbine 133.

Upper head 121 has three inlet ports for the three components being mixed. The port 136 for the thinner viscosity component is directed radially inwardly toward shaft 127, the bore 137 of head 121 being greater than the diameter of shaft 127 to provide an annular space down which the component flows from port 136. Similarly, the liquified Freon port 138 is radially disposed at about the level of component B port 136. Shaft 127 is roughened or knurled in the extension 135 which fits into bore 137 so that the Freon and thinner component are at least partially mixed together as soon as they are received in the mixing head 58. An annular chevron packing seal 139 is recessed into the upper end of head 121 and seals against shaft 127. Radial openings 141 are provided above seal 139 so that if component leaks out through seal 139 it escapes through openings 141. Above openings 141 is a sealing bushing 140 which completely seals off turbine 133 from contact with components, solvent or the like. Seal 139 and bushing 140 are spaced apart by tubular spacer 145 having four holes aligned with openings 141.

The thicker viscosity component is introduced into mixing head 121 through port 142 which enters the mixing chamber in an axial direction spaced radially outwardly from the center of shaft 127.

Above ports 136, 142, are plug valves 143, of conventional type, the stems 144 of the valves being diametrically opposed. A single actuating handle 146 is provided controlling both valves 143 so that the two components are turned on and off simultaneously. One of the valve stems 146 carried a cam 147. Pilot air valve body 148 is positioned in proximity to cam 147 and has a cam follower 149 on its stem 151. When the handle 146 is turned to open the valve the compressed air valve 148 is switched from one outlet to another. Valve inlet 152 is connected by hose 150 to the source of compressed air for driving mixing head turbine 133. Valve 148 is connected to pneumatic controls, not described or illustrated herein, for pumps for the various ingredients. Such controls are described in said application entitled, Foam Depositor System. Valve handle 154 on body 152 is used to connect passage 138 with a solvent flush pot (not shown) when it is necessary to clean the equipment.

The mixing head body 126 contains agitator propellers 156, 157, at either end of cylinder 126 mounted on shaft 127, the blades of propellers 156, 157, being pitched so as to create upward motion of the fluid in a direction counter to downward flow through head 58. Counter flow insures thorough mixing of the ingredients. Further, an annular shroud 158 is formed around the periphery of upper propeller 156. The cross section of the shroud 158 as shown in FIG. 2 is such that liquid is directed upward and radially inward by the shroud, thereby causing recirculation of the heavier component to augment mixing of the components together. It will be understood that the Freon is heavier than the other components and hence by reason of centrifugal force tends to move toward the cylinder wall 126 and might, were it not for means herein provided, run down the cylinder wall without proper mixing with the other components. Shroud 158 tends to direct the Freon back toward the shaft 127 for recirculation.

Shaft 127 carries a number of radially extending pins 159 and radially inward extending pins 161 are formed on the interior wall of cylinder 126, the various pins 159, 161, resembling a turnstile. The pins insure thorough mixing of the components as they move from the top to the bottom of cylinder 126 and are discharged through discharge orifice 129.

Below mixing head 58 is back pressure valve 171 likewise described in said application entitled, Foam Depositor System. Below valve 171 is an expansion chamber 181 described in said last mentioned application.

Directing attention to the structure shown in FIG. 5, it will be understood that proportioning pumps are used to pump components from a pair of component drums to the dispensing head. It is occasionally desirable to check upon the accuracy of the pumping system by collecting in separate containers the discharge of the two components into the dispensing heads and then comparing the weight or volume thereof with the desired proportion. As a preliminary step, eye bolts 116 are removed and then cylinder 126 and shaft 127. Tube 301 is used having an outside diameter slightly less than the inside diameter of bore 137. A groove is formed in the outside of tube 301 adjacent to its upper end to receive O-ring 302. The end of the tube 301 is forced into the bore 137 and the O-ring 302 seats the tube in place. A stop collar 303 is formed on tube 301 to impede upward movement thereof. Preferably, tube 301 has an oblique offset 304. A pair of containers 306, 307 is used with the calibrating instrument. Container 306 is positioned to receive the discharge from offset 304, whereas, container 307 receives the discharge from port 142.

In use, it will be seen that shaft 132 of air turbine 133 and chevron packing 139 seal off the upper end of bore 137. Hence the component received in port 136 passes through bore 137 and into tube 301 whence it is conveyed to container 306. The other component is received in port 142 and discharges into container 307. By comparing the weight or volume of the components in the two containers, the accuracy of the proportioning pumping systems can be checked.

Directing attention now to FIG. 6, it will be understood that at certain times, particularly when the system has been shut down for a long period, the components in the lines leading to dispensing head 58 have cooled to the point where they are no longer suitable for depositing foam or have otherwise deteriorated. It is desirable to re-circulate the components in such lines back to the drums, such as drums 24 and 25, from which they were originally drawn by the pumping system. The attachment shown in FIG. 6 is useful for such purpose. Preliminary to use of the attachment, cylinder 126 and shaft 127 have been removed. A fitting is used having a plate 311 which fits under the bottom of head 121. Fitting 311 has a flange 312 which fits into groove 124 and lodges against O-ring 123. One means of securing fitting 311 in place is to use eye bolts 116a which are generally similar to, but shorter than, eye bolts 116. The eyes 117a fit around studs 124 projecting from head 121. Nuts 118 are threaded on to the lower end of bolts 116a and bear against fitting 311, holding it in place. In the event that the pressure becomes excessive, the eyes 117a open permitting the head 121 and fitting 311 to be separated. The fitting 311 carries a tube 313 which fits up into bore 137. An O-ring 314 is located in a groove near the upper end of tube 313 and seals the tube in place. Tube 313 has an oblique offset 316 and terminates in a fitting 317 to which a hose 318 may be attached leading back to drum 25.

Fitting 311 also has a smaller tube 321 which fits up into port 142. A fitting 322 is installed on the outer end of tube 321 and is connected to a hose 323 which leads back to drum 24.

In use, the fitting is installed as heretofore explained. The pumping system is energized causing some components to flow through port 136 where it is received in tube 313 and conducted back to drum 25. Other component is pumped into port 142, is received into tube 321 and pumped back to drum 24. When re-circulation has been continued for a long enough period of time so that the components are of the desired consistency, the pumps are stopped and fitting 311 is removed and the normal dispensing head 58 re-installed.

Although I have described the present invention in some detail for purposes of illustration and example, it is understood that various changes and modifications may be practiced within the spirit of the invention and scope of the appended claims.

What is claimed:

1. A mixing and dispensing head comprising a first end cap formed with an annular groove in a face thereof, a second end cap formed with a second annular groove in a face thereof facing said first end cap, a hollow cylinder having a transverse cross section substantially conforming to the cross section of said annular grooves and having its end edges received in said grooves, sealing means in the bottoms of said grooves sealing said cylinder to said caps, said head formed with inlet ports for admission of components to be dispensed, said head being formed with a discharge port for discharge of mixed components, rotatable mixing means journalled in said caps and removably located inside said cylinder and including a rotating shaft and propeller blades projecting from said shaft, and rotating means for rotating said mixing means.

2. A head according to claim 1 which further comprises studs projecting from at least one of said first and second caps, a pair of eyebolts having open eyes fitting around said studs, means engaging the other of said first and second caps, and detachable means connecting said eyebolts to said last mentioned means, whereby upon increase of pressure within said cylinder said eyes spread to permit said caps to spread apart.

3. A mixing and dispensing head comprising a first end cap, a second end cap, a hollow cylinder engaging said end caps with pressure-tight seals, said head formed with inlet ports for admission of components to be dispensed, said head being formed with a discharge port for discharge of mixed components, rotating means mounted in said head, a rotatable shaft projecting through one of said caps for connection with said rotating means, a first seal in said one cap around said shaft, passageways intercommunicating between said shaft and atmosphere exteriorly of said first seal and a second seal around said shaft between said passageways and said rotating means, whereby leakage from said cylinder escapes through said passageways and said rotating means is protected from such leakage.

4. A mixing and dispensing head comprising a first end cap, a second end cap, a hollow cylinder between said caps, a shaft extending between said end caps interiorly of said cylinder, rotating means for said shaft, said first cap formed with a plurality of inlet ports for a plurality of components, said second cap formed with a discharge port, cooperating mixing rods on said shaft and cylinder, a propeller on said shaft adjacent said second cap pitched to direct the contents of said cylinder in a direction toward said first cap.

5. A mixing and dispensing head according to claim 4 in which said mixing rods comprise first radial rods on said shaft spaced axially along said shaft at intervals and second radial rods on said cylinder, said first and second rods being at axially spaced intervals, whereby the contents of said cylinder are stirred in turnstile fashion by said rods.

6. A mixing and dispensing head comprising a first end cap, a second end cap, a hollow cylinder between said caps, a shaft, rotating means for said shaft, said first cap formed with a plurality of inlet ports for a plurality of components, said second cap formed with a discharge port, cooperating mixing rods on said shaft and cylinder, a propeller on said shaft adjacent said first cap pitched to direct contents of said cylinder against said first cap and a shroud around said propeller curved to direct contents of said cylinder toward said first cap and inward toward said shaft.

7. A mixing dispensing head comprising a first end cap, a second end cap, a hollow cylinder between said caps, a shaft extending between said end caps interiorly of said cylinder, rotating means for said shaft, said first cap formed with a plurality of inlet ports for a plurality of components, said second cap formed with a discharge port, cooperating mixing rods on said shaft and cylinder, a first propeller on said shaft adjacent said second cap pitched to direct the contents of said cylinder in a direction toward said first cap, a second propellor on said shaft adjacent said first cap pitched to direct contents of said cylinder against said first cap, and a shroud around said second propellor curved to direct contents of said cylinder toward said first cap and inward toward said shaft.

8. A mixing and dispensing head comprising a first end cap formed with a substantially cylindrical, central recess, a second cap formed with a discharge port, a hollow cylinder between said caps, a shaft extending between said caps and journalled therein, said shaft extending through said central recess, and means for rotating said shaft, mixing means on said shaft, said first cap formed with a pair of first component inlet ports directed into said central recess, said first cap formed with a second component inlet port spaced outwardly from said central recess.

9. A mixing and dispensing head comprising a first end cap, a second end cap, a hollow cylinder between said caps, said head formed with input ports which admit components to be dispensed and a discharge port for discharge of mixed components, a rotatable shaft projecting through said first cap, rotatable mixing means on said first shaft, rotating means for rotating the end of said shaft projecting through said first cap and external of said hollow cylinder, said first cap formed with a central recess through which said mixing means projects and with an annular space surrounding said mixing means, two of said inlet ports opening into said annular space and a third inlet port opening through said first cap and spaced outwardly from said central recess, a portion of said shaft in said central recess having a roughened surface for mixing components admitted through said two of said inlet ports, said second cap being formed with a recess to receive and form a bearing for the end of said shaft opposite said rotating means, said discharge port being located in said second cap remote from said recess.

10. A mixing dispensing head comprising a first end cap formed with a substantially cylindrical, central recess, a second cap formed with a discharge port, a hollow cylinder between said caps, a shaft extending between said caps and journalled therein, said shaft extending through said central recess, and means for rotating said shaft, mixing means on said shaft, said first cap formed with a pair of first component inlet ports directed into said central recess, said first cap formed with a second component inlet port spaced outwardly from said central recess, a portion of said shaft extending into said central recess having a roughened surface.

11. A mixing and dispensing head comprising a first end cap formed with a substantially cylindrical, central recess, a second cap formed with a discharge port, a hollow cylinder between said caps, a shaft extending between said caps and journalled therein, said shaft extending through said central recess, and means for rotating said shaft, mixing means on said shaft, said first cap formed with a pair of first component inlet ports directed into said central recess, said first cap formed with a second component inlet port spaced outwardly from said central recess, said mixing means including a propeller on said shaft adjacent said first cap pitched to direct components in said cylinder upward toward said first cap and a shroud around said propeller curved to direct said components upward toward said first cap and inward toward said shaft.

References Cited by the Examiner

UNITED STATES PATENTS

| | | | |
|---|---|---|---|
| 658,456 | 9/1900 | McCausland | 222—129 |
| 1,885,253 | 11/1932 | Gonsett | 259—7 |
| 2,041,207 | 5/1936 | Rietz | 259—8 X |
| 2,389,524 | 11/1945 | Loewenstern | 259—8 X |
| 2,527,927 | 10/1950 | Grow | 222—129 |
| 2,847,196 | 8/1958 | Franklin et al. | 259—8 |
| 2,867,418 | 1/1959 | Merrels | 259—8 |
| 2,929,107 | 3/1960 | Andrew | 259—7 X |
| 3,051,455 | 8/1962 | Magester | 259—8 |
| 3,102,004 | 8/1963 | Grintz | 259—7 X |
| 3,128,995 | 4/1964 | Shaeffer | 259—7 X |

FOREIGN PATENTS 856,708  12/1960  Great Britain.

CHARLES A. WILLMUTH, *Primary Examiner.*